Patented Dec. 14, 1937

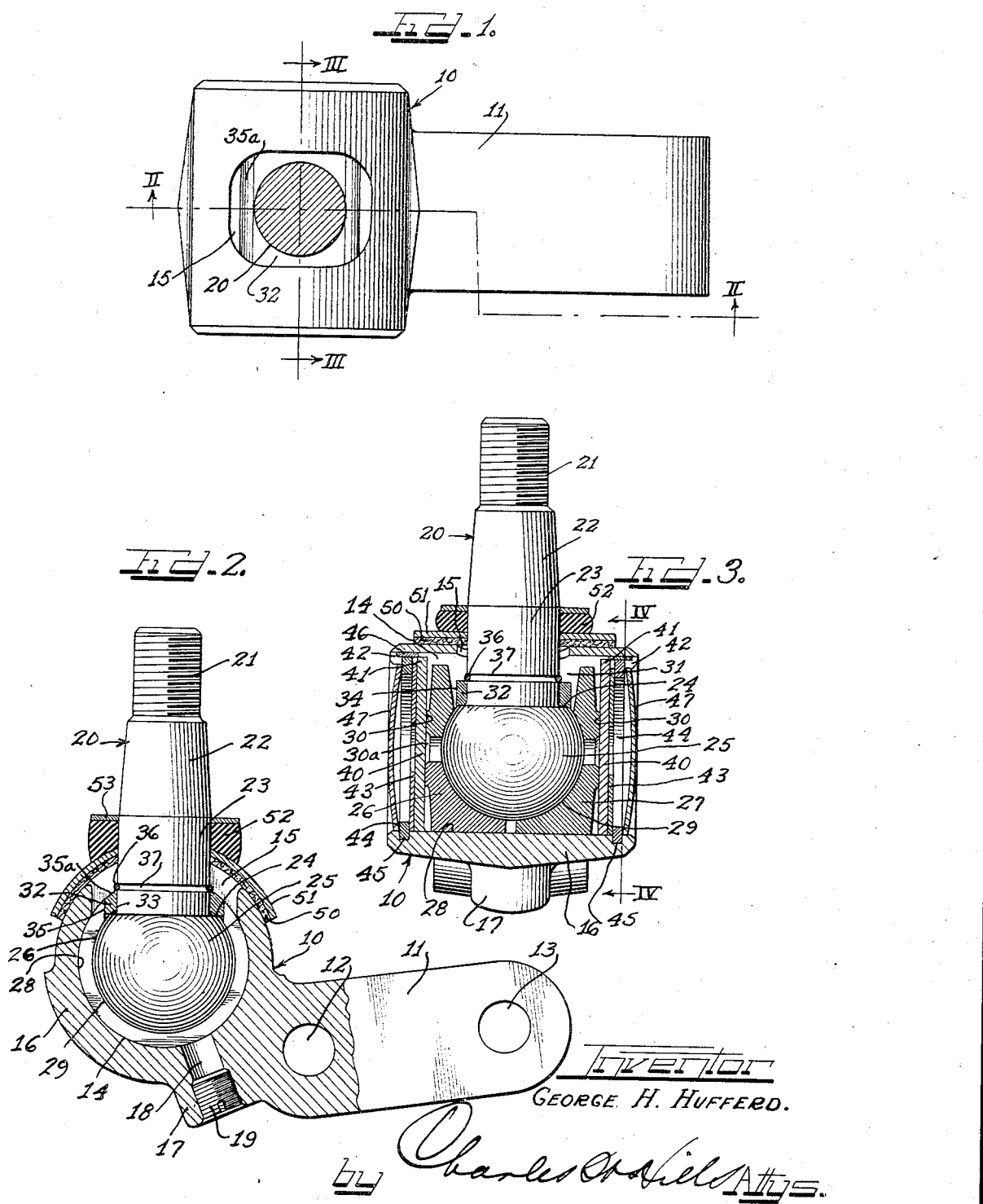

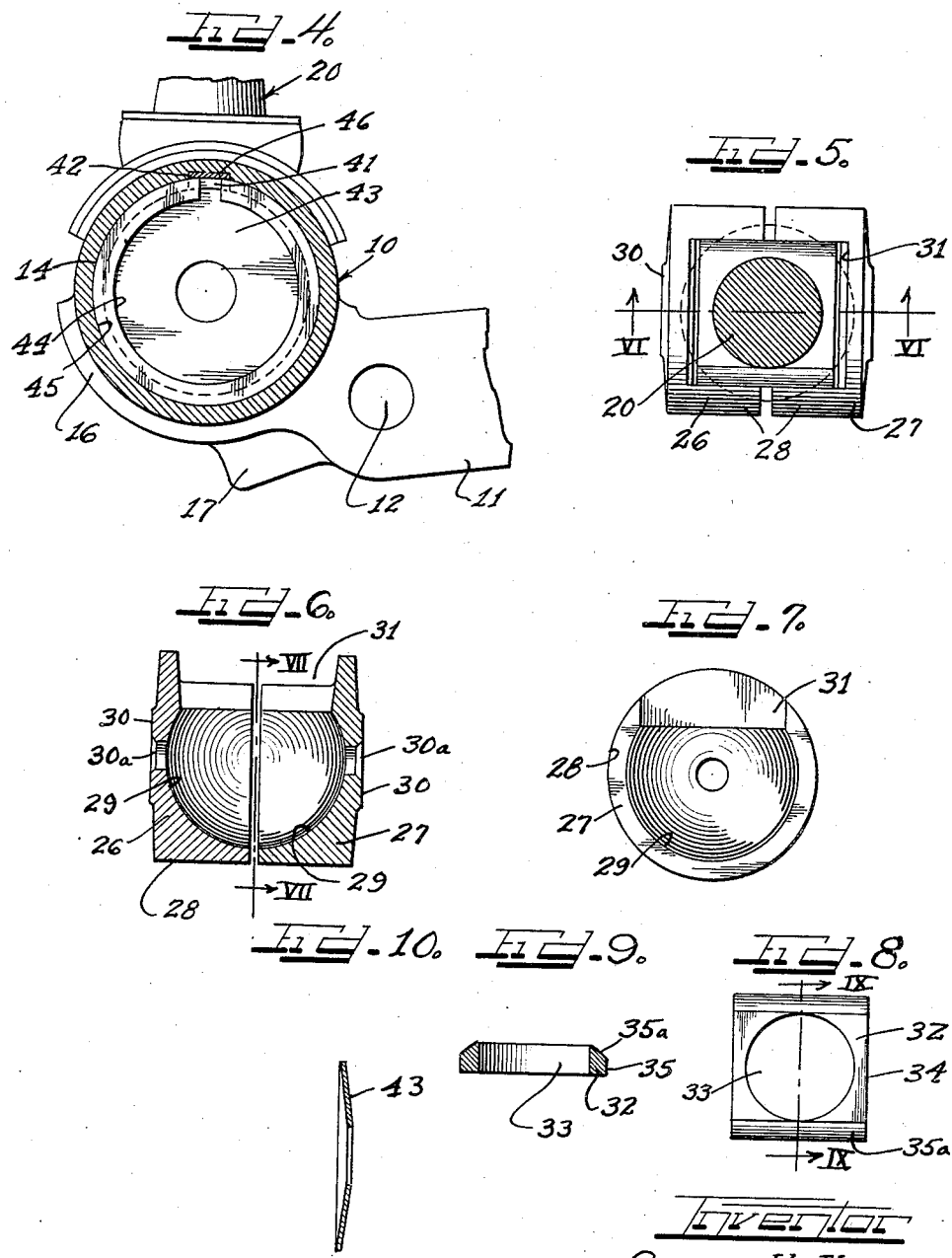

2,102,463

UNITED STATES PATENT OFFICE 2,102,463

BALL JOINT FOR FRONT WHEEL SUSPENSIONS

George H. Hufferd, Detroit, Mich., assignor to Thompson Products Incorporated, Cleveland, Ohio, a corporation of Ohio Application October 19, 1936, Serial No. 106,341

8 Claims. (Cl. 287—90)

This invention relates to joints having a cooperating pair of cylindrical bearing surfaces permitting relative tilting movement in one plane and a cooperating pair of segmental spherical bearing surfaces permitting relative tilting movements in other planes as well as rotation of the joint stud about its own axis. More specifically this invention relates to ball joints for operatively connecting the wheel supporting mechanism with the suspension mechanism of automobile independently suspended front wheel structures which joints are provided with separate pairs of cooperating bearing surfaces.

While the joints of this invention will be specifically hereinafter described in connection with front wheel suspensions for automotive vehicles it should be understood that the joints are adapted for wide usage in other mechanical connections.

It is known that the joints connecting the wheel supporting mechanism with the wheel suspending mechanism of independently sprung wheel mountings must carry heavy loads and are subject to almost constant tilting movements in operation. These tilting movements are mainly in one plane and it is highly desirable to provide bearing surfaces in the joints which readily permit this tilting movement without interfering with tilting movements or rotating movements of the joints in other planes.

According to this invention a ball ended stud is seated in a pair of seating members having segmental spherical inner bearing surfaces and cylindrical outer bearing surfaces. The seating members in turn are mounted in a cylindrical housing. When the stud is tilted relative to the housing in the plane in which most tilting occurs the stud carries the seating members therewith as a unit and the tilting movements in this plane are borne by the outer cylindrical surfaces of the seating members and the inner cylindrical surface of the housing member. However limited tilting movements of the stud relative to the housing and rotation of the stud about its own axis are freely permitted by the segmental spherical bearing surfaces of the ball end on the stud and the inner segmental spherical bearing surfaces of the seating members.

It is then an object of this invention to provide ball joints with separate pairs of cylindrical bearing surfaces for tilting movements in one plane and segmental spherical bearing surfaces for tilting movements in other planes and for rotation of the joint stud about its own axis.

A further object of this invention is to provide heavy duty ball joint structures capable of supporting heavy loads without interfering with free relative tilting and rotating movements of the joint parts.

A further object of this invention is to provide ball joint structures for independent front wheel suspensions of automotive vehicles.

A specific object of this invention is to provide ball joint structures having a cooperating pair of cylindrical bearing surfaces to carry heavy loads while permitting relative tilting movements in one plane and also having cooperating pairs of segmental spherical bearing surfaces permitting rotation of the joint stud about its own axis and relative tilting movements of the joint element in other planes without interfering with the main tilting movements provided by the cooperating cylindrical surfaces.

Other and further objects of this invention will become apparent to those skilled in the art from the following detailed description of the annexed sheets of drawings which disclose preferred embodiments of the invention.

On the drawings:

Figure 1 is a plan view, with a part shown in horizontal cross section of a joint according to this invention.

Figure 2 is a vertical cross-sectional view, with parts shown in elevation, taken substantially along the line II—II of Figure 1.

Figure 3 is a vertical cross-sectional view, with parts shown in elevation, taken substantially along the line III—III of Figure 1.

Figure 4 is a vertical cross-sectional view, with parts shown in elevation, taken substantially along the line IV—IV of Figure 3.

Figure 5 is a plan view, with a part shown in horizontal cross section, of the seating members and stud element of the joint in operative assembly.

Figure 6 is a vertical cross-sectional view of the seating members only, taken along the line VI—VI of Figure 5.

Figure 7 is an elevational view of the inner face of a seating member taken along the line VII—VII of Figure 6.

Figure 8 is a plan view of a rectangular washer member disposed around the stud shank.

Figure 9 is a vertical cross-sectional view taken substantially along the line IX—IX of Figure 8.

Figure 10 is a vertical cross-sectional view taken through a spring washer used in the joint structure.

As shown on the drawings:

As shown in Figures 1 to 4, the reference numeral 10 designates generally a joint housing having a laterally extending arm portion 11 provided with bolt holes 12 and 13 for attachment to the wheel supporting mechanism of individually suspended automotive front wheels. The housing 10 has a cylindrical bore 14 extending therethrough horizontally thereof to provide an open ended cylindrical socket.

An elongated opening 15 having major and minor axes is formed through the top of the housing with the major axis in alignment with the arm portion 11.

The housing 10 is preferably formed with a thickened base portion 16 to withstand the heavy compression loads supported by the joint structure. A boss portion 17 is formed on the central portion of the base of the housing 10 in front of the arm 11 thereof and is drilled out to provide a bore 18 therethrough in communication with the main bore 14 extending through the housing. The lower end of the bore 18 is threaded to receive a screw plug 19 therein for closing the bore. The passageway provided by the bore 18 serves as a means for introducing grease to the joint.

A stud 20 having a threaded top portion 21, an intermediate tapered portion 22, a cylindrical portion 23 below the tapered portion, an annular shoulder 24 extending from the bottom of the cylindrical portion 23 and a ball end 25 is seated in the housing 10 with the ball end disposed in the housing and the cylindrical portion 23 extending freely through the opening 15 in the top of the housing.

A pair of spaced complementary seating members 26 and 27 having outer cylindrical surfaces 28, segmental spherical inner surfaces 29, flat boss portions 30 on the sides thereof and rectangular cutaway portions 31 at the tops thereof are disposed between the ball end 25 of the stud 20 and the cylindrical socket walls 14 of the housing 10. The cylindrical portion 23 of the stud 20 projects freely through the opening provided by the cutaway portions 31 of the seating elements.

A rectangular washer or block 32 having a central bore 33 therethrough, flat side walls 34, and flat end walls 35 with rounded top portions 35a of a curvature corresponding with the curvature of the bore 14 of the socket is seated around the cylindrical portion 23 of the stud on the shoulder 24 therebelow and held in position by a spring wire 36 snapped into a groove 37 formed around the periphery of the cylindrical portion 23 of the stud. The block fits into the cutaway portions 31 of the seating members 26 and 27 and as shown in Figure 3 the side walls 34 of the block are spaced from the side walls defining the cutaway portions 31 of the seating elements to permit limited tilting movement of the stud in planes parallel with the minor axes of the housing opening 15.

As shown in Figure 2 the flat end walls 35 of the block 32 snugly abut the side walls of the cutaway portions 31 of the seating members so that when the stud is tilted in planes parallel to the major axis of the housing opening 15 the tilting movement is transmitted to the seating elements and is borne on the outer cylindrical surfaces 28 of the seating elements and the inner cylindrical wall 14 of the housing. The rounded portions 35a of the block form an extension of the cylindrical outer bearing surfaces of the seating elements and permit the block to be moved on the cylindrical wall 14 of the housing.

Rotation of the stud about its own axis is readily permitted since the cylindrical portion 23 of the stud can freely revolve in the cylindrical bore 33 of the block 32 and the ball end 25 of the stud is freely rotatable on the segmental spherical inner surfaces 29 of the seating elements.

Metal discs 40 are inserted through the open ends of the housing 10 in the bore 14 in abutting relation to the flat faces of the bosses 30 formed on the central portions of the side walls of the seating members. As shown in Figures 3 and 6, the bosses 30 of the seating members 26 and 27 preferably have lubricant passageways 30a formed therethrough. Tabs 41 are formed on the discs 40 to fit in slots 42 cut in both ends of the wall 14 of the housing 10 at the top thereof to prevent rotation of the discs.

Spring washers 43 of the type shown in Figure 10 are next positioned alongside of the discs 40 to resiliently urge the discs against the bosses 30 of the seating elements thereby tending to move the seating elements towards each other to take up wear on the ball end 25 of the stud and on the segmental spherical inner surfaces 29 of the seating elements. Split washers 44 abut the spring washers 43 to flatten the same. The split washers 44 are seated in annular grooves 45 cut in the cylindrical wall 14 of the housing near the ends thereof. Strips 46 of a flexible material such as leather are inserted in the slots 42 above the split washers 44 to permit removal of the washers from the grooves 45. Thus a tool can be inserted in the slots 42 and worked between the flexible strips 46 and the outer periphery of a washer 44 to compress the washer out of the groove 45 and permit its removal from the housing.

Spring plates or covers 47 are snapped into the ends of the housing over the washers 44 to seal the housing. These spring covers can be readily pried out of the housing by insertion of a tool into the slots 42.

It should therefore be understood that the abutment plates 40 for the flat sides of the seating members 26 and 27 have tabs snugly seated in slots cut in the inside housing wall to prevent rotation of the plates. At the same time, however, the plates are urged against the seating members by spring washers which are compressed or flattened by split washers seated in grooves formed in the housing. The spring washers and split washers need not be provided with tabs since rotation of these members is immaterial. However to facilitate disassembly of the joint the flexible strips 46 are inserted in the slots 42 receiving the tabs 41 of the abutment plates and are disposed over the split washers to permit insertion of a tool for compressing the washers out of their grooves.

A dust cap or sealing cap comprising an arcuate shaped piece of leather or fabric material 50 is disposed snugly around the cylindrical portion 23 of the stud and extends over the cylindrical outside top portion of the housing 10. A metal plate 51 of corresponding shape covers the material 50.

A rubber washer 52 is preferably disposed around the cylindrical portion of the stud 23 and compressed against the top of the plate 51 to hold the same on the housing. A metal plate 53 may be disposed over the rubber washer 52. A connecting eye member (not shown) is disposed around the tapered portion 22 of the stud and may be forced downwardly against the plate 53 by a nut (not shown) threaded on the portion 21 of the stud.

From the above descriptions it should be understood that the joint structure of this invention permits free rotation of the stud member about its own axis and limited tilting of the stud in planes other than the main operating plane on segmental spherical bearing surfaces provided by a ball end of the stud and by inner faces of seating members. Tilting movements of the stud in the main operating plane are permitted throughout a wide range and are borne by outer cylindrical surfaces of the seating members and the inner cylindrical wall of the housing. A block is seated around the shank of the stud above the ball end thereof to impart tilting movement in the main operating plane to the cylindrical surfaces of the seating members and housing. Since these cylindrical surfaces are large in size as compared with the segmental spherical surfaces the tilting movements in the main operating plane are distributed over a large area and free tilting movement is permitted even under heavy load.

Automatic wear compensating means are provided in the joint to urge the seating members into closer relationship with each other to take up wear on their bearing surfaces.

The provision of separate cooperating pairs of bearing surfaces for tilting movements in the main operating plane and for tilting movements in other planes and rotation of the stud about its own axis provides a joint structure having a long life even under severe load conditions. When the joints of this invention are used in front wheel suspensions for automotive vehicles the up and down movements of the wheel which occur constantly during driving of the vehicle must be permitted by joints which can carry heavy loads and at the same time permit movements in other directions without interfering with the tilting movements caused by the up and down motion of the wheel.

The joints of this invention can be readily supplied with large quantities of lubricant through a single grease channel provided in the housing of the joint. If desired the ball end of the stud can be provided with lubricant grooves to aid in the distribution of the grease from the point at which it is inserted.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A joint comprising a housing having a cylindrical bore therein, a pair of complementary seating elements rotatable in said bore and having inner bearing surfaces therein, an integral headed stud member having the integral head thereof seated on the inner bearing surfaces of the seating elements in tiltable and rotatable relation therewith and means associated with said stud to transmit tilting movements thereof in planes at right angles to the axis of the bore to the seating elements.

2. A joint comprising a housing having a cylindrical inner wall, a pair of complementary seat elements having outer cylindrical surfaces in bearing engagement with the cylindrical wall of the housing and having inner segmental spherical bearing surfaces, a stud member extending into said housing having a ball and seated in said seat elements in bearing engagement with the segmental spherical inner surfaces thereof and a shank portion spaced from the seat elements whereby limited tilting movements of the stud in some planes are borne on the ball end and inner surfaces of the seat elements and means associated with said stud shank to transmit tilting movements of the stud in planes normal to the axis of the housing bearing wall to the seating elements to be borne on the outer cylindrical surfaces of the seating elements and the cylindrical wall of the housing.

3. A joint comprising a housing having a cylindrical bearing wall therein and an opening in the side wall thereof giving entrance thereto, a pair of space opposed complementary seating elements having outer cylindrical surfaces in engagement with the cylindrical bearing wall of the housing, said seating elements also having segmental spherical inner surfaces and cut-away portions on the side walls thereof giving entrance to their inner surfaces, a ball stud having a shank portion extending through the opening provided by the cutaway portions and through the housing opening, said ball stud having a ball end seated on the inner surfaces of the seating elements, a block disposed around the stud shank in rotatable relation thereto having end walls normal to the axis of the housing bearing wall spaced from the seating elements in the cutaway portions thereof and side walls paral'el to the axis of the housing bearing wall abutting the seating elements whereby limited tilting movements of the stud relative to the housing and rotation of the stud about its own axis are provided by the cooperating bearing surfaces of the ball end and inner surfaces of the seating elements and tilting movements through a wide angle are provided by the bearing wall of the housing and the outer cylindrical surfaces of the seating elements and means for urging the seating elements into closer engagement with the ball end of the stud for taking up wear developed during use of the joint.

4. A joint structure comprising a stud having a shank portion and a ball end, a pair of complementary seating members disposed around the ball end of the stud having cut away portions defining a space between the stud shank and seating members, said seating members also having segmental spherical inner bearing surfaces in engagement with the ball end of the stud and outer cylindrical bearing surfaces at right angles to the axis of the stud, a housing having an inner cylindrical wall disposed around the cylindrical outer surfaces of the seating members, means carried by the housing to urge the seating members into closer engagement with the ball end of the stud and a block disposed around the stud shank in the space defined by the cut away portions of the seating members for transmitting some of the tilting movements of the stud to the seating members to be borne on the cylindrical wall of the housing.

5. A joint structure comprising a housing having a laterally extending integral arm portion and a cylindrical bore therethrough at right angles to the arm portion thereof providing a cylindrical bearing wall therein, a pair of spaced complementary seating elements having outer cylindrical surfaces in bearing engagement with the cylindrical wall of the housing and inner segmental spherical bearing surfaces in space opposed relation, said seating elements having cutaway portions in the side walls thereof providing an opening giving entrance to the segmental spherical surfaces therein, a stud having a shank portion extending freely through the opening and a head portion seated on the segmental spherical surfaces thereof in bearing engagement therewith, said housing having an opening through which the shank portion of the stud freely extends, a block disposed around the shank of the stud in the opening provided by the cutaway portions of the seating elements, said block having side walls normal to the bore of the housing in spaced relation from the seating elements and having end walls parallel to the bore abutting the seating elements, means carried by the shank of said stud to hold said block in the opening in rotatable relation to the stud whereby rotation of the stud about its own axis and limited tilting movement of the stud relative to the housing is permitted by the ball end of the stud and the inner segmental spherical bearing surfaces of the seating elements and tilting movement of the stud relative to the housing through a wide angle is permitted by the cylindrical outer surfaces of the seating elements and the cylindrical wall of the housing, abutment plates disposed in said housing engaging the ends of the seating members and spring means urging said abutment plates against the seating elements to move the same into closer relation with each other for taking up wear developed during use of the joint.

6. A joint structure comprising a housing having a horizontal cylindrical bore therethrough and having an elongated opening in a side wall thereof giving entrance to the bore, a stud extending freely through said opening and having a ball end disposed in said bore, a pair of seating elements disposed around the ball end of the stud having inner segmental spherical bearing surfaces for cooperating with said ball end and outer cylindrical bearing surfaces for cooperating with the cylindrical bore of the housing, means in said housing urging said seating elements toward each other to take up wear developed during use of the joint, said stud being tiltable in said seating elements in planes parallel to the axis of the bore and means associated with said stud to transmit tilting movements thereof in planes at right angles to the axis of the bore to the seating elements whereby said tilting movements are borne by comparatively large cylindrical bearing surfaces and limited tilting movements and relative rotation of the stud about its own axis are borne by the ball end of the stud and the segmental spherical inner surfaces of the seating elements.

7. A joint comprising a housing, a stud extending freely therefrom, spaced seating elements interposed between the stud and the housing, said housing and seating elements having cooperating cylindrical bearing surfaces permitting tilting movements of the stud in one plane, said seating elements and stud having cooperating segmental spherical bearing surfaces permitting free rotation of the stud about its own axis and tilting movements of the stud in all planes, means for transmitting tilting movements of the stud in planes normal to the axis of the cylindrical bearing surfaces to the seating elements and means for urging the seating elements together to take up wear developed during use of the joint.

8. A joint adapted to carry heavy loads comprising a housing having a laterally extending arm portion and a cylindrical bore therethrough at right angles to the arm portion, cylindrical seating elements rotatable in said bore and having extended cylindrical outer surfaces in full bearing contact with the housing, a stud having a shank portion extending freely from said housing and an integral head portion freely tiltable and rotatable in said seating elements, means disposed around the shank of the stud to transmit tilting movements thereof at right angles to the axis of the bore to the seating elements, plates secured against rotation in the ends of the bore and means for urging said plates against the seating elements to move the seating elements into closer relationship.

GEORGE H. HUFFERD.